(12) United States Patent
Wang et al.

(10) Patent No.: US 9,851,609 B2
(45) Date of Patent: Dec. 26, 2017

(54) DISPLAY PANEL

(71) Applicant: Century Technology (Shenzhen) Corporation Limited, Shenzhen (CN)

(72) Inventors: Ming-Tsung Wang, New Taipei (TW); Chih-Chung Liu, New Taipei (TW); Li-Fang Wang, Shenzhen (CN); Wen-Qiang Yu, Shenzhen (CN)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 29 days.

(21) Appl. No.: 14/792,136

(22) Filed: Jul. 6, 2015

(65) Prior Publication Data
US 2016/0291426 A1    Oct. 6, 2016

(30) Foreign Application Priority Data
Apr. 3, 2015  (CN) .......................... 2015 1 0156602

(51) Int. Cl.
*G02F 1/1343* (2006.01)
*G02F 1/139* (2006.01)

(52) U.S. Cl.
CPC ...... *G02F 1/134363* (2013.01); *G02F 1/1396* (2013.01); *G02F 1/134309* (2013.01)

(58) Field of Classification Search
CPC ............... H01L 29/7869; G02F 1/1368; G02F 1/134363; G02F 1/1396; G02F 1/134309
USPC ....................................................... 349/141
See application file for complete search history.

(56) References Cited

U.S. PATENT DOCUMENTS

| 2008/0273134 | A1* | 11/2008 | Kim ...................... G02F 1/1323 349/43 |
| 2009/0135354 | A1* | 5/2009 | Mitsui ............... G02F 1/133707 349/114 |
| 2012/0086665 | A1* | 4/2012 | Song ................... G02F 1/13338 345/174 |
| 2014/0036192 | A1* | 2/2014 | Iyama ............... G02F 1/134363 349/46 |

FOREIGN PATENT DOCUMENTS

| CN | 1991452 A | 7/2007 |
| CN | 102707528 A | 10/2012 |

\* cited by examiner

*Primary Examiner* — Charles Chang
(74) *Attorney, Agent, or Firm* — ScienBiziP, P.C.

(57) ABSTRACT

A display panel includes a TFT substrate, an opposite substrate, a liquid crystal layer, a first display area, and a second display area. The opposite substrate is opposite to the TFT substrate. The liquid crystal layer is sandwiched between the TFT substrate and the opposite substrate. The liquid crystal layer includes a plurality of liquid crystal molecules. A horizontal electric field is formed in a portion of the liquid crystal layer corresponding to the first display area. A vertical electric field is formed in the other portion of the liquid crystal layer corresponding to the second display area. When the display panel is powered on, a portion of the liquid crystal molecules in one of the horizontal electric field and the vertical electric field are rotated, and the other portion of liquid crystal molecules in the other one of the horizontal electric field and the vertical electric field are rotated.

2 Claims, 8 Drawing Sheets

DISPLAY PANEL

CROSS-REFERENCE TO RELATED APPLICATIONS

This application claims priority to Chinese Patent Application No. 201510156602.0 filed on Apr. 3, 2015, the contents of which are incorporated by reference herein.

FIELD

The subject matter herein generally relates to a display panel.

BACKGROUND

Liquid crystal display (LCD) devices, such as thin film transistor liquid crystal display (TFT-LCD) panel and organic light emitting diode (OLED) display panel, are widely used, because their small size, light weight, low radiation, low power cost, and full-color display. In-plane switching (IPS) mode liquid crystal display (LCD) panels are becoming more and more popular because they can present a wider viewing angle to a viewer than twisted nematic (TN) mode LCD panels.

BRIEF DESCRIPTION OF THE DRAWINGS

Implementations of the present technology will now be described, by way of example only, with reference to the attached figures.

DETAILED DESCRIPTION

Figure 1:
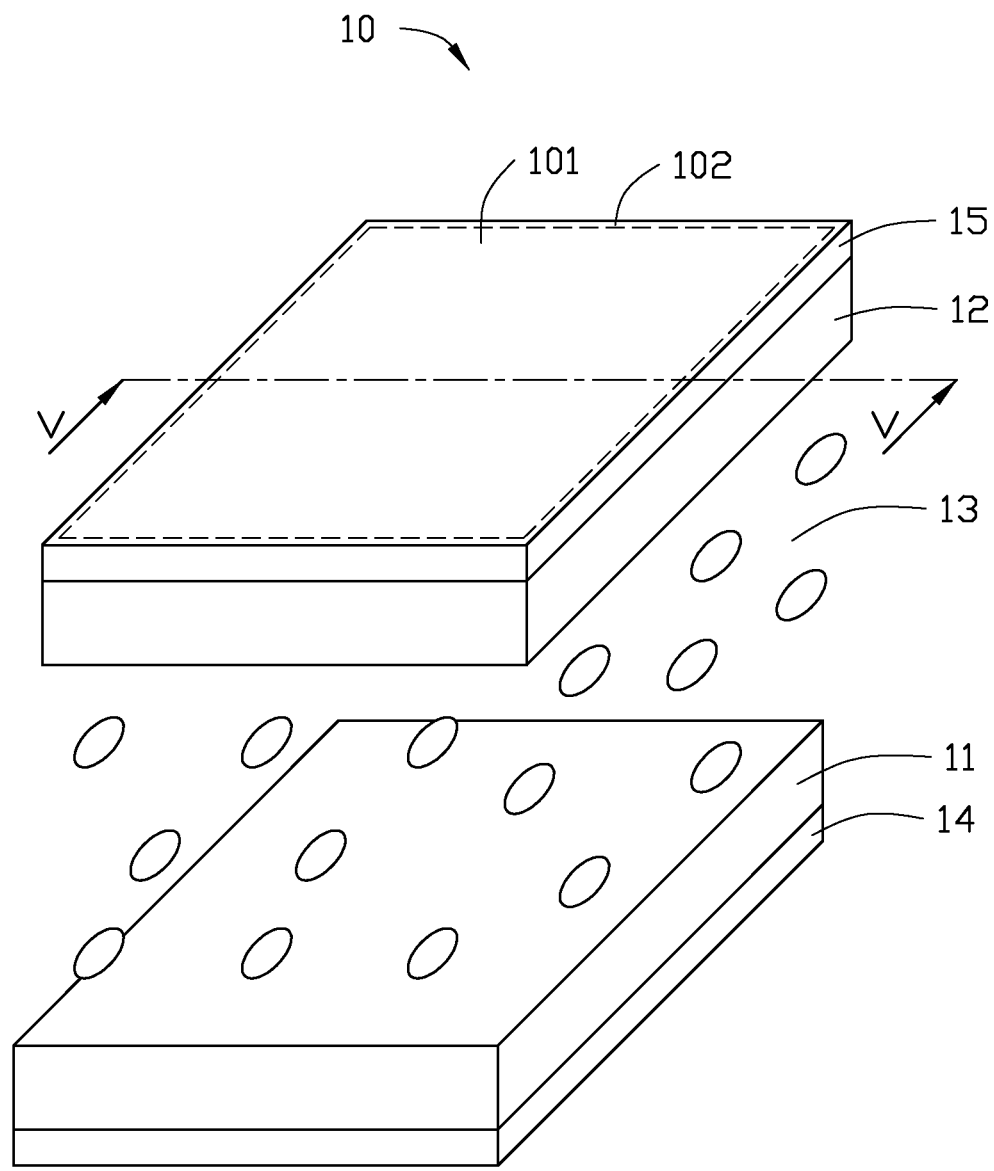
FIG. 1 is a diagrammatic view of an embodiment of a display panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising", when utilized, means "including, but not necessarily limited to"; it specifically indicates open-ended inclusion or membership in the so-described combination, group, series and the like.

FIG. 1 is a diagrammatic view of an embodiment of a display panel 10. The display panel 10 includes a TFT substrate 11, an opposite substrate 12, a liquid crystal layer 13, a first polarizer 14, and a second polarizer 15. The liquid crystal layer 13 is located adjacent to the TFT substrate 11. The opposite substrate 12 is located on an opposite side of the liquid crystal layer 13 from the TFT substrate 11. The liquid crystal layer 13 is sandwiched between the TFT substrate 11 and the opposite substrate 12. The liquid crystal layer 13 includes a plurality of liquid crystal molecules. The first polarizer 14 is disposed at one side of the TFT substrate 11 away from the liquid crystal layer 13. The second polarizer 15 is disposed at one side of the opposite substrate 12 away from the liquid crystal layer 13. The display panel 10 further includes an active area 101 and a non-active area 102 surrounding the active area 101. The active area 101 is configured to sense touch operations and to display image information. The non-active area 102 cannot detect the touch operations.

Figure 2:
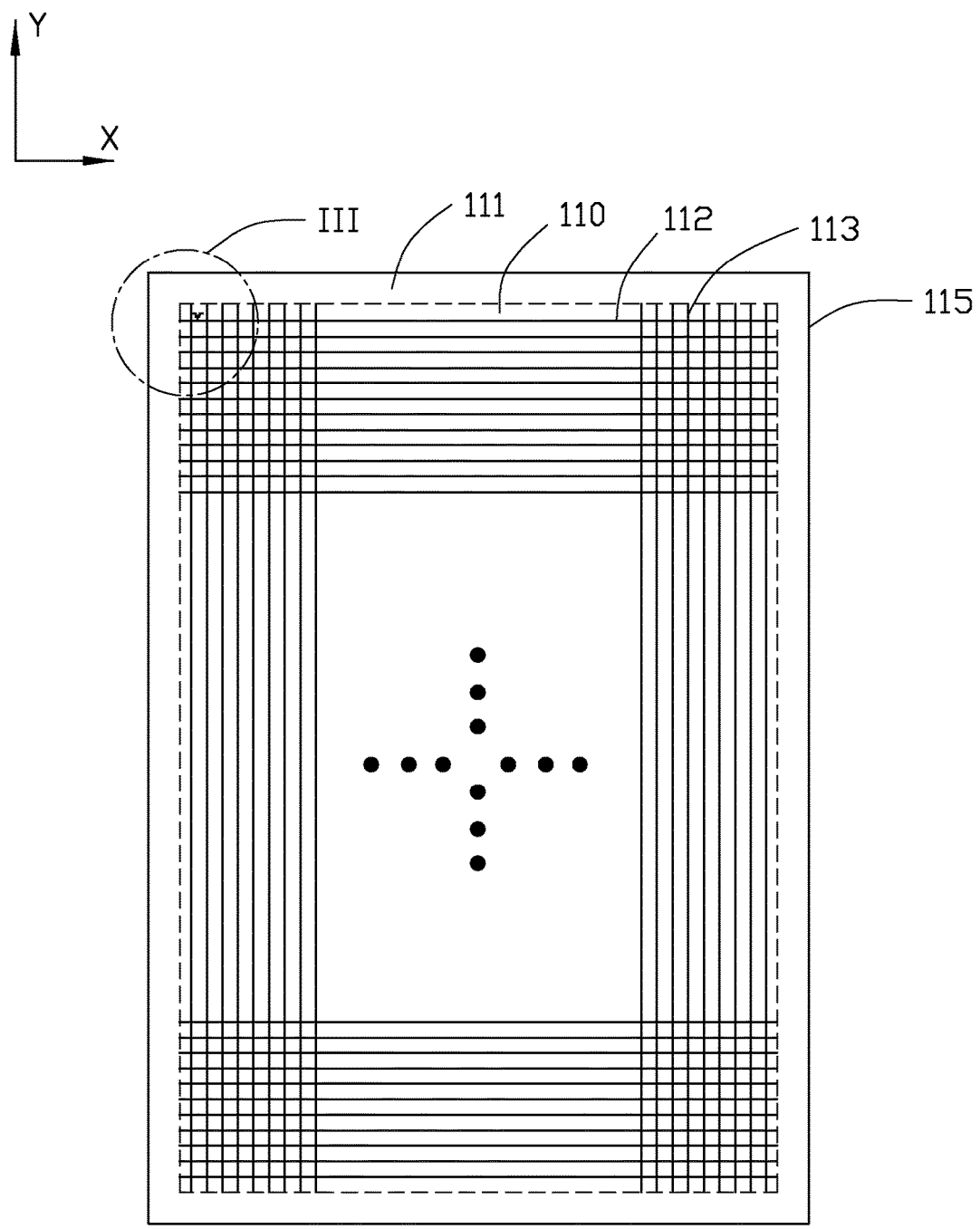
FIG. 2 is a top view of a thin film transistor (TFT) substrate of the display panel.
Figure 3:
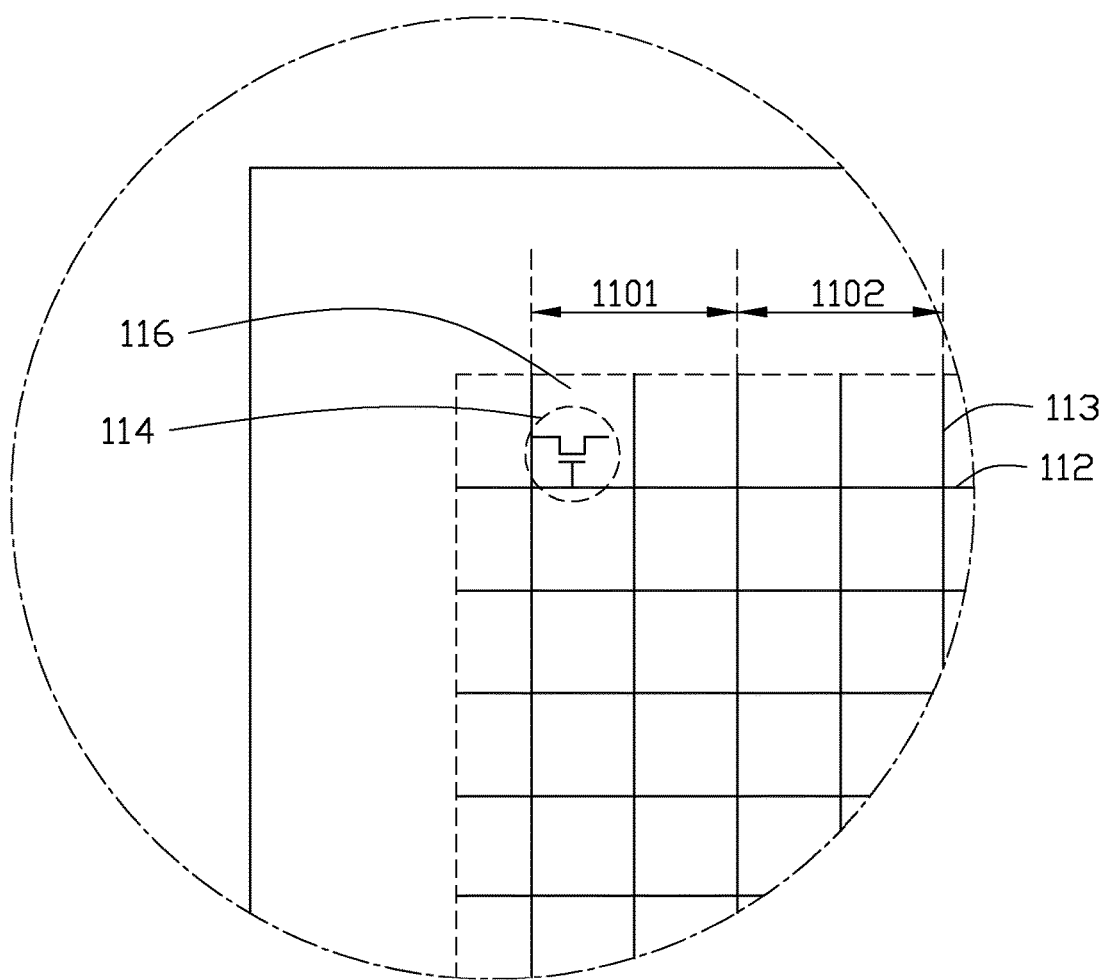
FIG. 3 is an enlarged view of a circled area III-III in FIG. 2.

Referring to FIG. 2 and FIG. 3, the TFT substrate 11 includes a functional area 110 corresponding to the active area 101 and a border area 111 corresponding to the non-active area 102. The functional area 110 is surrounded by the border area 111.

The TFT substrate 11 includes a plurality of gate lines 112, a plurality of data lines 113, a plurality of TFTs 114, and a first substrate 115. The gate lines 112, the data lines 113, and the TFTs 114 are disposed on the first substrate 115. Each of the TFTs 114 is coupled to one of the gate lines 112 and one of the data lines 113. The gate lines 112 can be arranged in parallel and extend along a first direction X. The data lines 113 can be arranged in parallel and extend along a second direction Y perpendicular to the first direction X. The gate lines 112 and data lines 113 are insulated and intersected from each other to define a plurality of pixel areas 116. Each of the TFTs 114 is located adjacent to an intersection of a corresponding gate line 112 and a corresponding data lines 113 in one pixel area 116. In this embodiment, the first substrate 115 can be made of glass, quartz, or other rigidity inorganic materials. In other embodiment, the first substrate 115 can be made of plastics, rubber, polyester, or other flexible organic materials.

The display panel 10 further includes a plurality of first display areas 1101 and a plurality of second display areas 1102. The first display areas 1101 and the second display areas 1102 are located in the functional area 110. A horizontal electric field can be formed in a portion of the liquid crystal layer 13 corresponding to each of the first display areas 1101, and a vertical electric field can be formed in the other portion of the liquid crystal layer 13 corresponding to each of the second display areas 1102. In this embodiment, the first display areas 1101 and the second display areas 1102 are alternately arranged along the first direction X. In this embodiment, the first display areas 1101 and the second display areas 1102 extend along the second direction Y. Thus, a display mode of a portion of the display panel 10 corresponding to each of the first display areas 1101 is an In Plane Switching (IPS) display mode, while a display mode of the other portion of the display panel corresponding to each of the second display areas 1102 is a Twist Nematic (TN) display mode.

Figure 4:
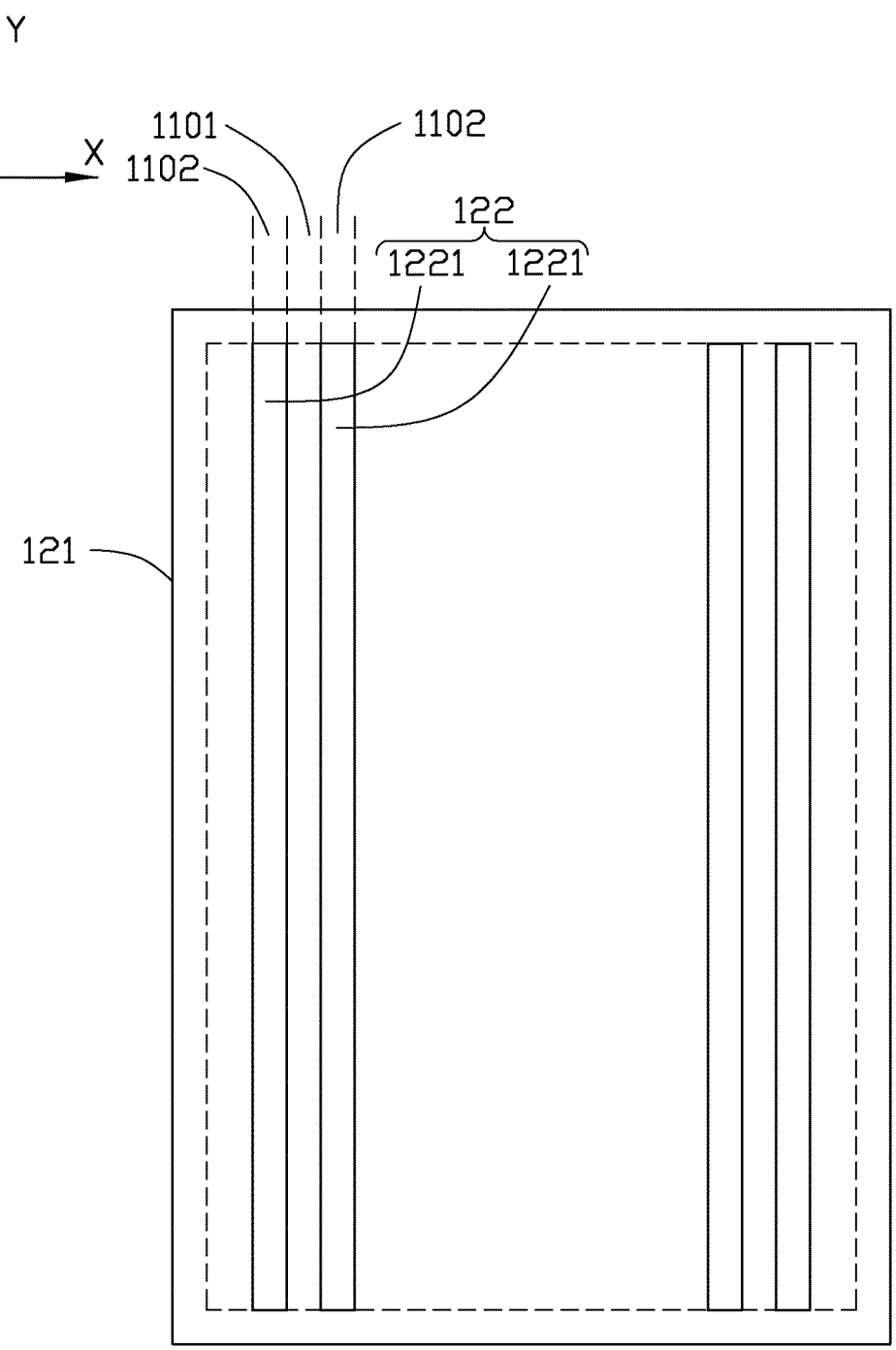
FIG. 4 is a top view of an opposite substrate of the display panel.

Referring to FIG. 4, the opposite substrate 12 includes a second substrate 121 and a second common electrode layer 122. The second common electrode layer 122 includes a plurality of second common electrodes 1221 arranged along the first direction X. In this embodiment, the second common electrodes 1221 are corresponding to the second display areas 1102. A space is defined between two adjacent second common electrodes 1221 and is corresponding to one of the first display areas 1101.

Figure 5:
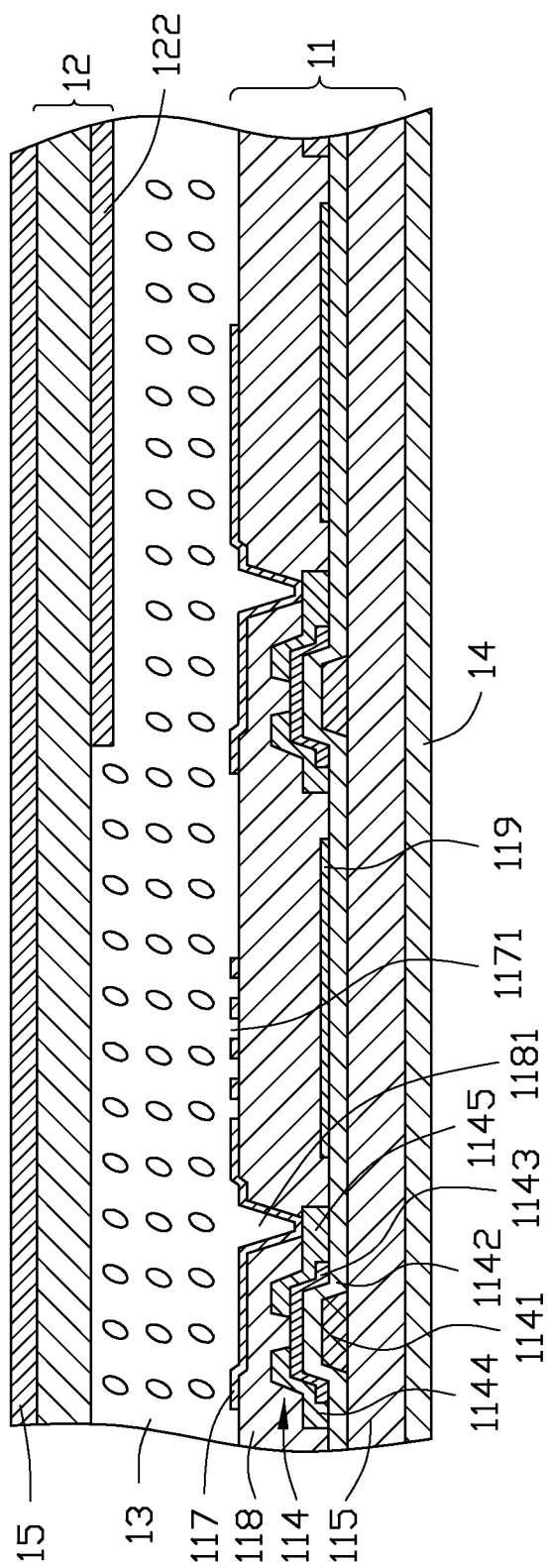
FIG. 5 is a cross-sectional view of the display panel, taken along line V-V of FIG. 1.

Referring to FIG. 5, the TFT substrate 11 includes a plurality of pixel electrodes 117, a passivation layer 118, and a plurality of first common electrode layers 119. The TFTs 114 are formed on the first substrate 115. The passivation layer 118 is formed on the TFTs 114. Each of the pixel electrodes 117 is formed on the passivation layer 118 and is coupled to one of the TFTs 114. Each of the first common electrode layers 119 is formed on the first substrate 115 and is located between the first substrate 115 and the pixel electrodes 117. The first common electrode layers 119 are insulated from the pixel electrodes 117.

The TFT 114 includes a gate electrode 1141, a gate insulation layer 1142, a channel layer 1143, a source electrode 1144, and a drain electrode 1145. The gate electrode 1141 is formed on the first substrate 115. The gate insulation layer 1142 is formed on the first substrate 115 and the gate electrode 1141 and completely covers the first substrate 115 and the gate electrode 1141. The channel layer 1143 is formed on the gate insulation layer 1142 corresponding to the gate electrode 1141. The source electrode 1144 and the drain electrode 1143 are formed on the gate insulation layer 1142 coupled at opposite sides of the channel layer 1143 respectively.

The passivation layer 118 covers the gate insulation layer 1142, the channel layer 1143, the source electrode 1144, and the drain electrode 1145. The first common electrode layer 119 is located between the passivation layer 118 and the gate insulation layer 1142. A connection hole 1181 is defined in the passivation layer 118 corresponding to the drain electrode 1145. The pixel electrode 117 is disposed on the passivation layer 118 and is coupled to the drain electrode 118 via the connection hole 1181. In this embodiment, a plurality of slits 1171 are defined in the pixel electrodes 117 corresponding to the first display area 1101.

Figure 6:
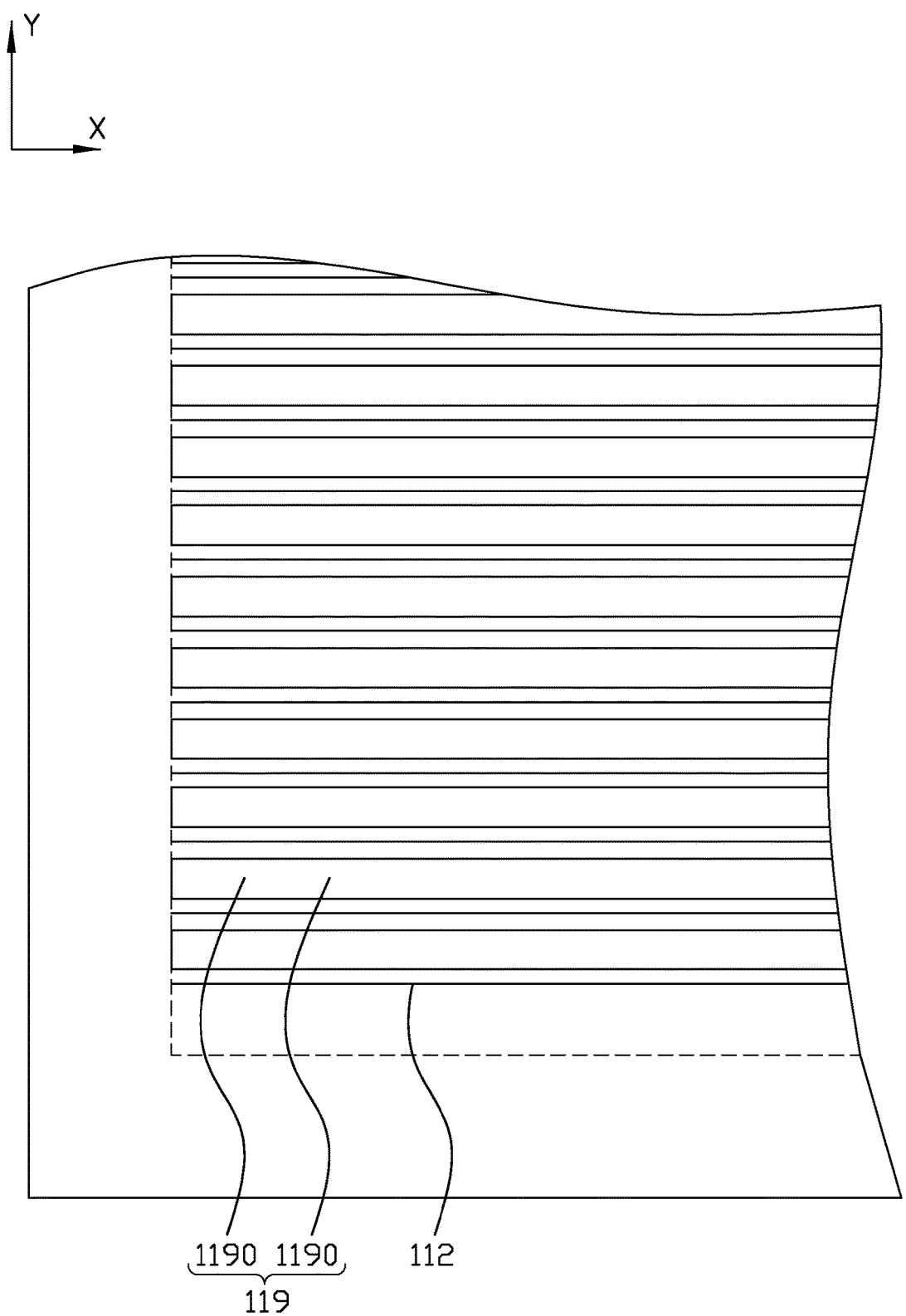
FIG. 6 is an enlarged view of a first common electrode layer of the display panel.

Referring to FIG. 6, the first common electrode layer 119 includes a plurality of first common electrodes 1190. The first common electrodes 1190 are arranged along the second direction Y. Each of the first common electrodes 1190 is extended along the first direction X. Each of the scan lines 112 is located within the space defined between two adjacent first common electrodes 1190.

In this embodiment, the first common electrode layer 119 and the pixel electrodes 117 corporately form the horizontal electric field in the liquid crystal layer 13 corresponding to the first display areas 1101. The second common electrode layer 122 and the pixel electrodes 117 corporately form the vertical electric field in the liquid crystal layer 13 corresponding to the second display area 1102. Thus, either the display panel 10 is in a dark state or in an illuminated state, a portion of the liquid crystal molecules in one of the horizontal electric field and the vertical electric field are stayed in a natural distributed state, and the other portion of liquid crystal molecules in the other one of the horizontal electric field and the vertical electric field are rotated. The dark state means that the display panel 10 is displaying a black image. The illuminated state means that the display panel 10 is displaying a nonblack image.

Figure 7:
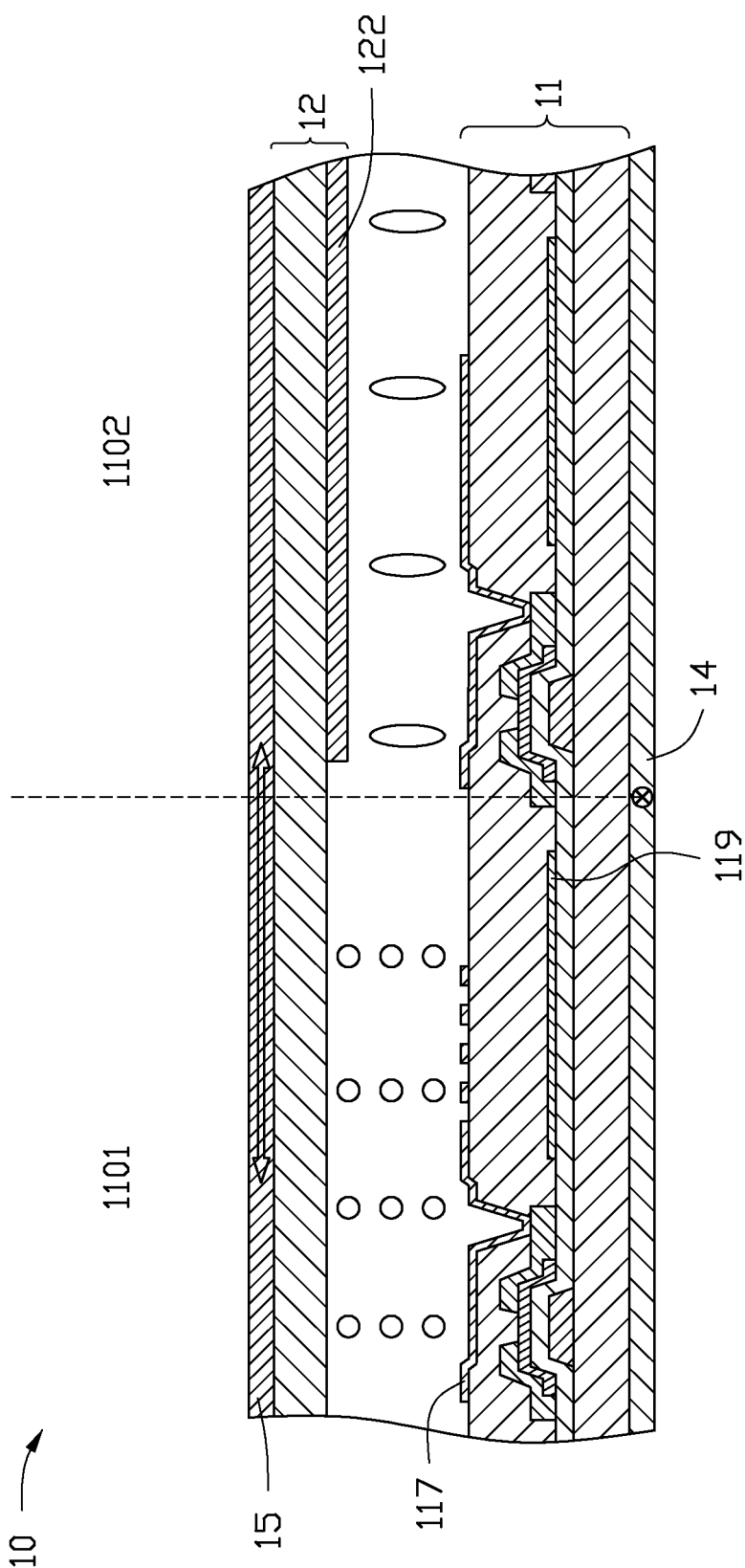
FIG. 7 is a diagrammatic view of the display pane in a dark state.
Figure 8:
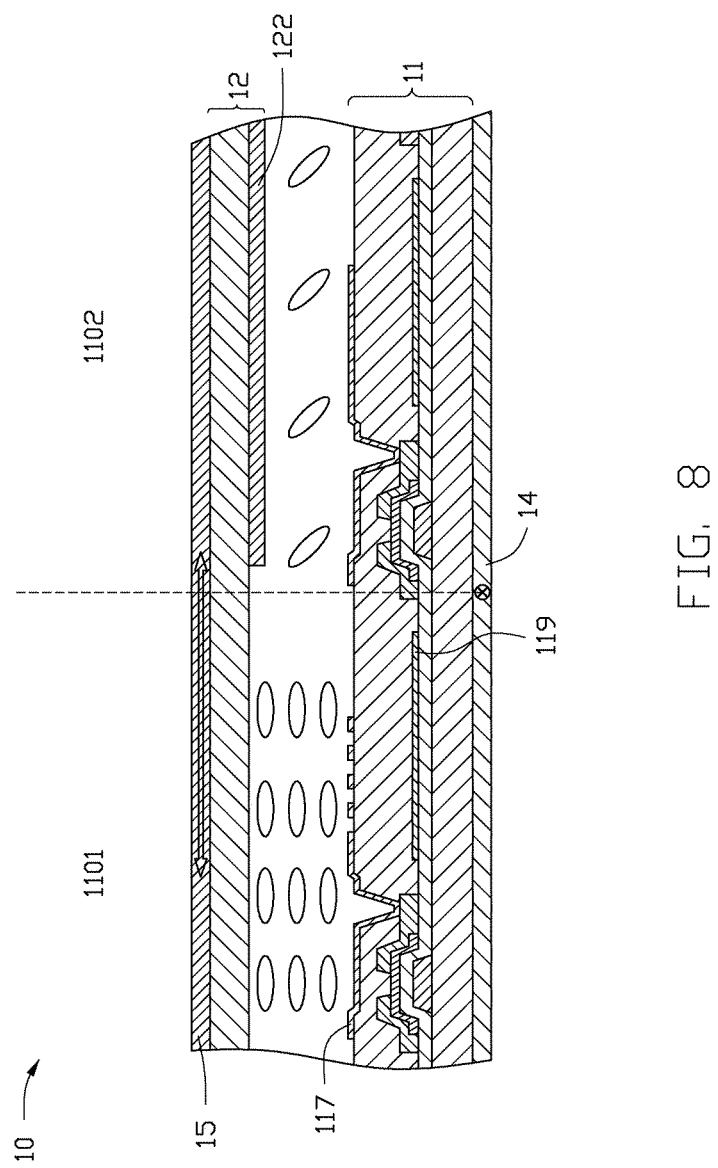
FIG. 8 is a diagrammatic view of the display panel in an illuminated state.

Referring to FIG. 7 and FIG. 8, in this embodiment, a polarization direction of the first polarizer 14 is the same with the second direction Y, and a polarization direction of the second polarizer 15 is the same with the first direction X. The polarization direction of the first polarizer 14 is vertical to the polarization direction of the second polarizer 15. A display mode of a portion of the display panel 10 corresponding to each of the first display areas 1101 is an In Plane Switching (IPS) display mode, while a display mode of the other portion of the display panel 10 corresponding to each of the second display areas 1102 is a Twist Nematic (TN) display mode. That is, an axial direction of the light passing through the liquid crystal molecules will be rotated while the liquid crystal molecules corresponding to the first display area 1101 are rotated or the liquid crystal molecules corresponding to the second display area 1102 are not rotated. An axial direction of the light passing through the liquid crystal molecules will not be rotated while the liquid crystal molecules corresponding to the first display area 1101 are not rotated or the liquid crystal molecules corresponding to the second display area 1102 are rotated.

When the display panel 10 is in a dark state, there would be no voltage applied to the first common electrode layer 119 and the pixel electrodes 117 corresponding to the first display area 1101, and there would be no electric field formed to rotate the liquid crystal molecules corresponding to the first display area 1101 and an axial direction of the light passing through the liquid crystal molecules corresponding to the first display area 1101 will not be rotated, and a polarization direction of the light passing through the liquid crystal molecules is the same with the polarization direction of the first polarizer 14 which is vertical to the polarization direction of the second polarizer 15. Thus the light cannot pass through a portion of the second polarizer 15 corresponding to the first display area 1101, and the display panel 10 corresponding to the first display area 1101 is in the dark state. At this time, a voltage is applied to the second common electrode layer 122 and the pixel electrodes 117 corresponding to the second display area 1102, an electric field will be formed to rotate the liquid crystal molecules corresponding to the second display area 1102 and an axial direction of the light passing through the liquid crystal molecules corresponding to the second display area 1102 will be rotated, a polarization direction of the light passing through the liquid crystal molecules is the same with the polarization direction of the first polarizer 14 which is vertical to the polarization direction of the second polarizer 15. Thus the light cannot pass through a portion of the second polarizer 15 corresponding to the second display area 1102, and the display panel 10 corresponding to the second display area 1102 is in the dark state. Consequently, the whole display panel 10 works in the dark state.

When the display panel 10 is in an illuminated state, a voltage is applied to the first common electrode layer 119 and the pixel electrodes 117 corresponding to the first display area 1101, an electric field will be formed to rotate the liquid crystal molecules corresponding to the first display area 1101 and an axial direction of the light passing through the liquid crystal molecules corresponding to the first display area 1101 will be rotated, and a polarization direction of the light passing through the liquid crystal molecules is different from the polarization direction of the first polarizer 14 which is vertical to the polarization direction of the second polarizer 15. Thus the light can pass through a portion of the second polarizer 15 corresponding to the first display area 1101, and the display panel 10 corresponding to the first display area 1101 is in the illuminated state. At this time, there would be no voltage is applied to the second common electrode layer 122 and the pixel electrodes 117 corresponding to the second display area 1102, and there would be no electric field formed to rotate the liquid crystal molecules corresponding to the second display area 1102 and an axial direction of the light passing through the liquid crystal molecules corresponding to the second display area 1102 will not be rotated, and a polarization direction of the light passing through the liquid crystal molecules is different from the polarization direction of the first polarizer 14 which is vertical to the polarization direction of the second polarizer 15. Thus the light can pass through a portion of the second polarizer 15 corresponding to the second display area 1102, and the display panel 10 corresponding to the second display area 1102 is in the illuminated state. Consequently, the whole display panel 10 works in the illuminated state.

Furthermore, the first common electrodes 1190 and the second common electrodes 1221 are perpendicular to each other. The first common electrodes 1190 can be further configured to serve as touch scan electrodes of the display panel 10, and the second common electrodes 1221 can be further configured to serve as touch sensing electrodes of the display panel 10, to detect touch operations applied on the display panel 10.

As described above, the display panel 10 has the advantage of presenting a wide viewing angle and fast responsibility compared to traditional IPS mode LCD or TN mode LCD.

The embodiments shown and described above are only examples. Many details are often found in the art such as the other features of a display panel. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A display panel comprising:
a TFT substrate;
a liquid crystal layer located adjacent to the TFT substrate and comprising a plurality of liquid crystal molecules;
an opposite substrate on a side of the liquid crystal layer facing away from the TFT substrate, the liquid crystal layer between the TFT substrate and the opposite substrate;
a first display area, wherein the liquid crystal molecules corresponding to the first display area rotate when a horizontal electric field is formed in the first display area; and
a second display area adjacent to the first display area, wherein the liquid crystal molecules corresponding to the second display area rotate when a vertical electric field is formed in the second display area;
wherein when the liquid crystal molecules corresponding to the second display area are rotated, the liquid crystal molecules corresponding to the first display area are not rotated; when the liquid crystal molecules corresponding to the first display area are rotated, the liquid crystal molecules corresponding to the second display area are not rotated;
wherein the TFT substrate comprises a first common electrode layer and a plurality of pixel electrodes, and the opposite substrate comprises a second common electrode layer; the first common electrode layer and a portion of the plurality of pixel electrodes are located in the first display area, and the second common electrode layer and the other portion of the plurality of pixel electrodes are located in the second display area; each of the plurality of pixel electrodes in the first display area defines a plurality of slits, and each of the plurality of pixel electrodes in the second display area does not define any slit; and
wherein when a voltage is applied to the first common electrode layer and the pixel electrodes in the first display area, no voltage is applied to the second common electrode layer and the pixel electrodes in the second display area; an electric field is formed to rotate the liquid crystal molecules corresponding to the first display area, to allow the light to pass through the liquid crystal molecules corresponding to the first display area; and no electric field is formed to rotate the liquid crystal molecules corresponding to the second display area, to allow the light can pass through the liquid crystal molecules corresponding to the second display area.

2. A display panel, comprising:
a TFT substrate;
a liquid crystal layer adjacent to the TFT substrate and comprising a plurality of liquid crystal molecules;
an opposite substrate on a side of the liquid crystal layer away from the TFT substrate, the liquid crystal layer between the TFT substrate and the opposite substrate;
a first display area; and
a second display area adjacent to the first display area, wherein when the display panel is powered on, the liquid crystal molecules corresponding to one of the first display area and the second display area are rotated, and the liquid crystal molecules corresponding to other one of the first display area and the second display area are not rotated;
wherein the TFT substrate comprises a first common electrode layer and a plurality of pixel electrodes, and the opposite substrate comprises a second common electrode layer; the first common electrode layer and a portion of the plurality of pixel electrodes are located in the first display area, and the second common electrode layer and the other portion of the plurality of pixel electrodes are located in the second display area; each of the plurality of pixel electrodes corresponding to the first display area defines a plurality of slits, and each of the plurality of pixel electrodes corresponding to the second display area does not define any slit; and
wherein when a voltage is applied to the first common electrode layer and the pixel electrodes corresponding to the first display area, no voltage is applied to the second common electrode layer and the pixel electrodes corresponding to the second display area; an electric field is formed to rotate the liquid crystal molecules corresponding to the first display area, to allow the light to pass through the liquid crystal molecules corresponding to the first display area; and no electric field is formed to rotate the liquid crystal molecules corresponding to the second display area, to allow the light to pass through the liquid crystal molecules corresponding to the second display area.

* * * * *